UNITED STATES PATENT OFFICE.

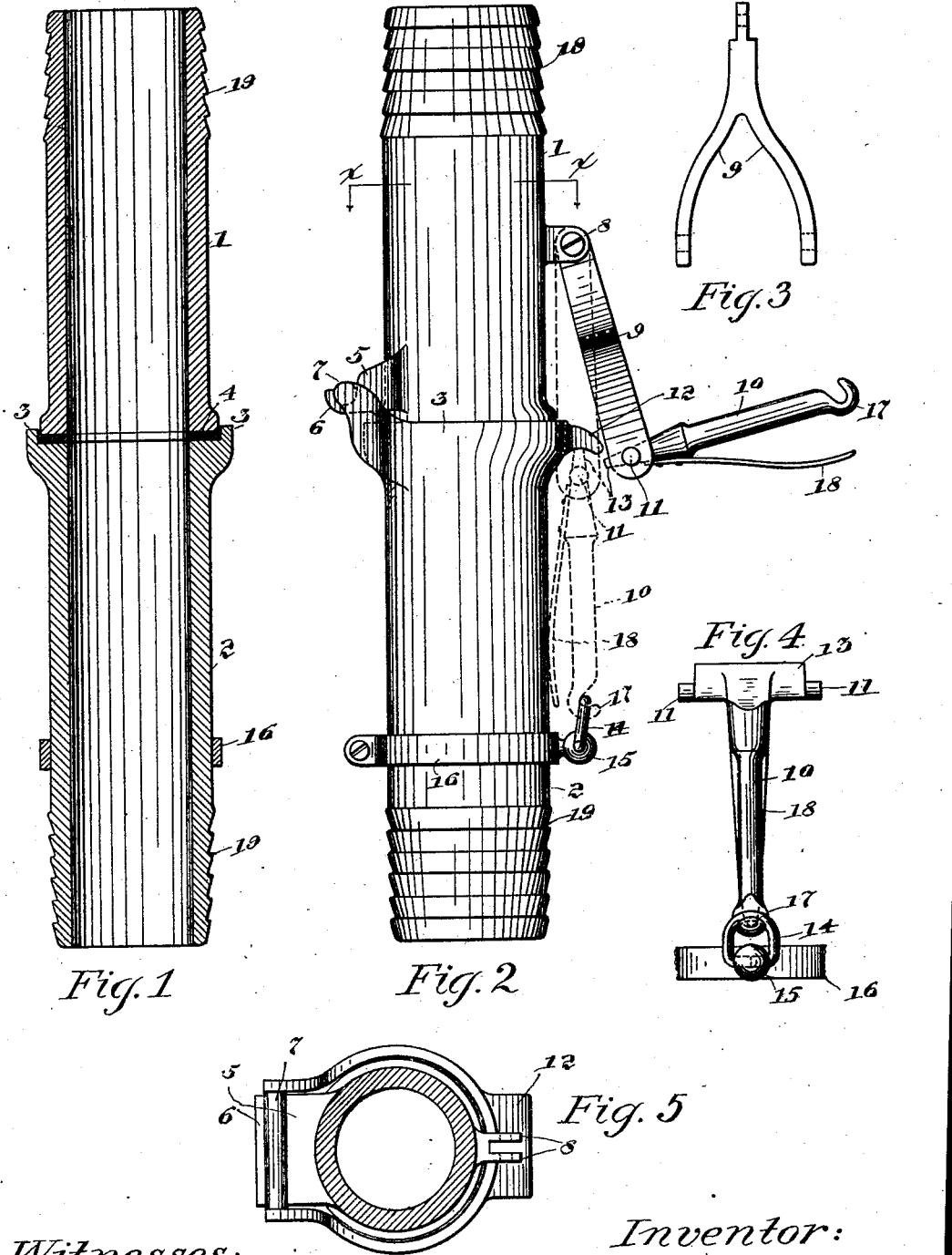

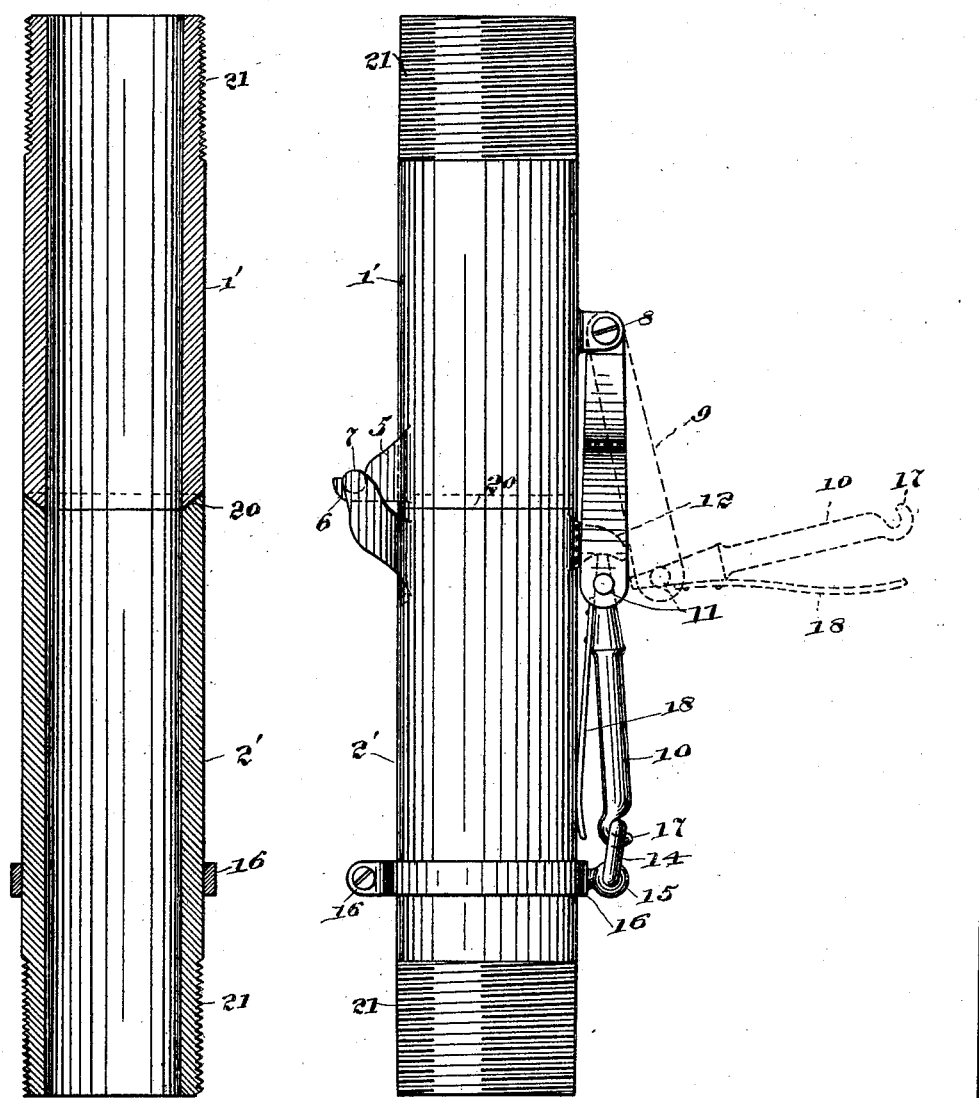

ERNEST MAREK, OF CHICAGO, ILLINOIS.

HOSE AND PIPE COUPLING.

937,833.   Specification of Letters Patent.   Patented Oct. 26, 1909.

Application filed February 8, 1909. Serial No. 476,668.

*To all whom it may concern:*

Be it known that I, ERNEST MAREK, a citizen of the United States, residing at Chicago, county of Cook, and State of Illinois, have invented certain new and useful Improvements in Hose and Pipe Couplings, of which the following is a specification.

My invention relates to improvements in hose couplings, the object being to provide a simple and quick acting device of this character which shall be efficient and reliable in use.

A further object of my invention is to provide certain modifications in the coupling to adapt the same for use as a pipe coupling.

Other objects will appear hereinafter.

With these objects in view my invention consists in such a novel construction and arrangement of parts all as will be hereinafter fully described and particularly pointed out in the appended claims.

My invention will be more readily understood by reference to the accompanying drawings forming a part of this specification, and in which, Figure 1 is a central longitudinal section of my invention, Fig. 2 is a side elevation of my invention in its preferred form showing the action of the quick acting coupling device, Figs. 3 and 4 are detail elevations, Fig. 5 is a transverse section taken on the line $x$—$x$ of Fig. 2, Fig. 6 is a central longitudinal section of the modified form of coupling adapted for use as a pipe coupling, and Fig. 7 is a side elevation of the same.

Referring now to the drawings 1 indicates one tubular member of the hose coupling and 2 the other. A flange 3 is provided on the member 2 in order to properly position the member 1 relative to the same, and a gasket 4 of rubber or other yieldable material is provided between the adjacent ends of said members. Adjacent the end of the member 1 a lug 5 is provided having a hook 6 adapted to engage a loop 7 extending from and integral with the member 2. This forms a pivot or hinge connecting the members 1 and 2.

In order to compress the gasket 4 and to lock the hose connection a clamping device is provided arranged diametrically opposite the hook 6 and the loop 7. This comprises two perforated ears 8 integral with the member 1 to which is pivoted a fork 9. A substantially T-shaped lever 10 is provided with two ears 11 which are pivoted in the fork 9, which thus serves as a link to attach lever 10 to tube 1'. A hook 12 is provided on the member 2 and with which the portion 13 of the lever 10 is adapted to engage. The fork 9 and the lever 10 are so arranged that the portion 13 may engage with the hook 12 when said lever is positioned at 90 degrees with the axis of the members 1 and 2, and when said lever is turned into a position parallel with the axis of said members, as indicated by dotted lines in Fig. 2 the gasket 4 is compressed and consequently a tight connection is formed. In this action, the portion 13 acts as a fulcrum of lever 10, which thus exerts a powerful leverage to draw tubes 1 and 2 together.

To lock the lever 10 in the dotted line position, a ring 14 is provided, the same being pivoted in a ball 15 integral with the ring 16 which is clamped to the member 2. A hook 17 provided at one extremity of the lever 10 is adapted to engage the ring 16 which in conjunction with the curved leaf spring 18 secured to the lever 10 locks the connection. In order to release the lever 10 the spring 18 is slightly compressed by pressing said lever with the hand when the ring 16 may be thrown out of engagement with the hook 17.

A plurality of serrations 19 are formed at the extremities of the members 1 and 2 in order that the ends of the members may be securely connected to the rubber hose.

In the modified form of coupling which is suitable for water or steam pipes, a ground joint 20 is provided and pipe threads 21 are formed at the extremities of the members 1' and 2'. The clamping device is similar to that shown for a hose coupling and the same reference numerals are used to designate the parts of the same.

While I have shown what I deem to be the preferable forms of my improved couplings, I do not wish to be limited thereto, as there might be modifications of the same which would be comprehended within the scope of my invention.

Having described my invention what I claim as new and desire to secure by Letters Patent is:

1. In a hose coupling, the combination of two tubular members; a hook and loop connection between said tubular members at one side; a clamping lever having a link connection with one of said tubular members on the other side; a hook on the other tubular member adapted to serve as a fulcrum for said clamping lever; a spring carried by said clamping lever and adapted to throw the same toward unclamping position; a hook on the end of said clamping lever; and a ring secured to the corresponding tubular member and adapted to engage the clamping lever hook, substantially as described.

2. In a hose coupling, the combination of two tubular members having means for positioning the same in axial alinement; a yieldable gasket interposed between the adjacent ends of said tubular members; a hook and loop connection between said tubular members at one side; a clamping lever having a link connection with one of said tubular members on the other side; a hook on the other tubular member adapted to serve as a fulcrum for said clamping lever; a spring carried by said clamping lever and adapted to throw the same toward unclamping position; a hook on the end of said clamping lever; and a ring secured to the corresponding tubular member and adapted to engage the clamping lever hook, substantially as described.

In testimony whereof I have signed my name to this specification in the presence of two subscribing witnesses.

ERNEST MAREK.

Witnesses:
JOSHUA R. H. POTTS,
JANET E. HOGAN.